Figure 1:
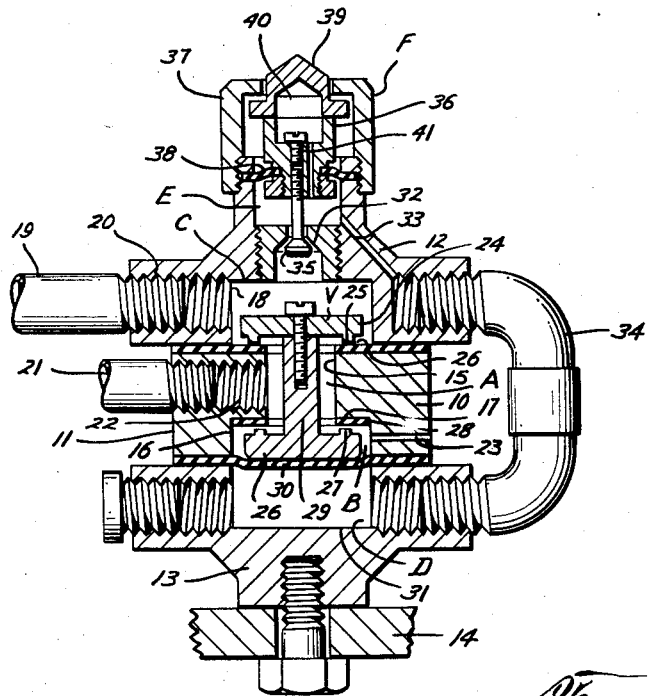

Oct. 6, 1959          A. S. PARKS          2,907,347

CONTROL UNITS FOR PRESSURE-ACTUATED DEVICES

Original Filed July 3, 1951          2 Sheets-Sheet 1

Asbury S. Parks
INVENTOR.

BY
ATTORNEYS

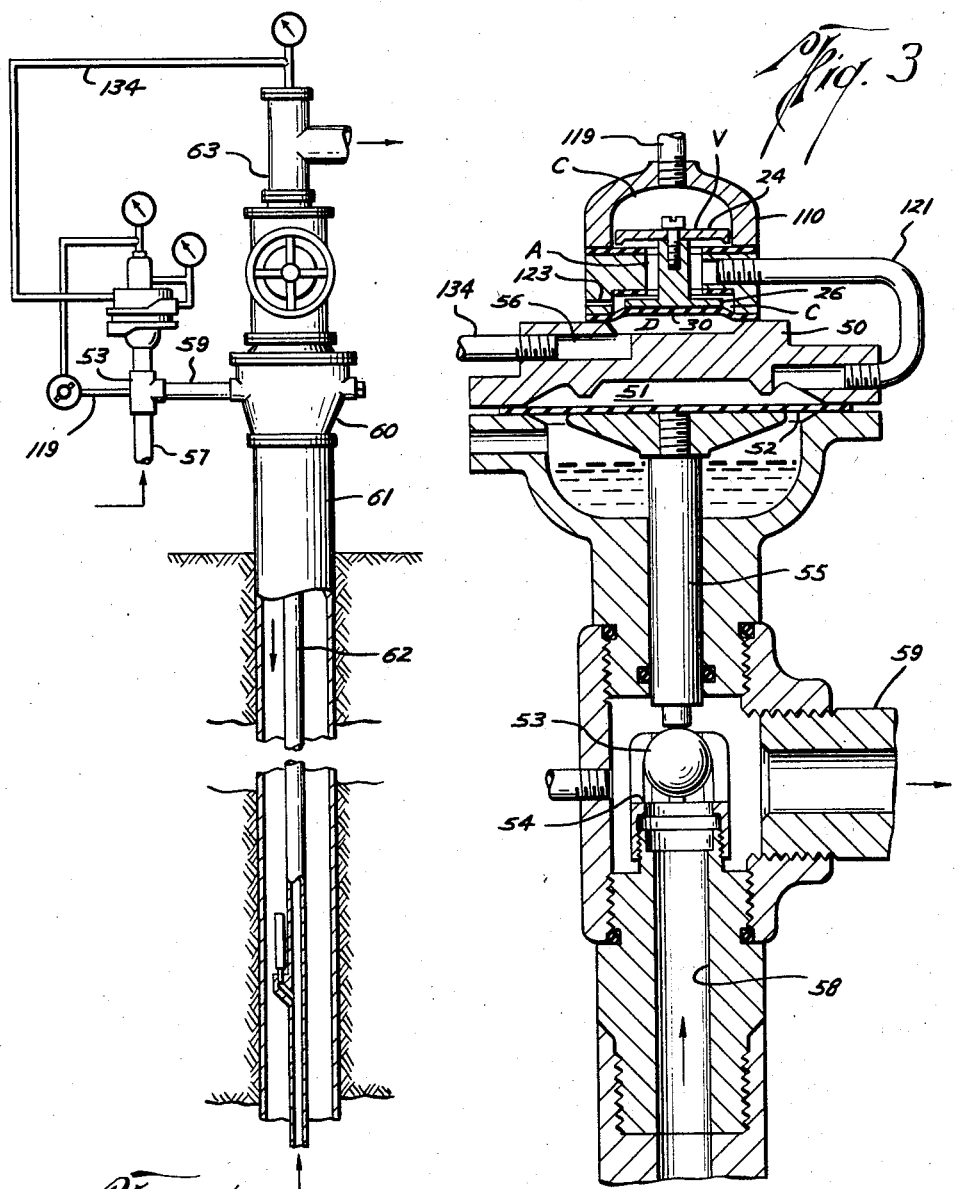

United States Patent Office 2,907,347
Patented Oct. 6, 1959

2,907,347

CONTROL UNITS FOR PRESSURE-ACTUATED DEVICES

Asbury S. Parks, Houston, Tex.

Continuation of application Serial No. 235,017, July 3, 1951. This application October 8, 1958, Serial No. 766,129

4 Claims. (Cl. 137—620)

This invention relates to new and useful improvements in control units for pressure-actuated devices.

This application is filed as a continuation of my co-pending application, Serial No. 235,017, filed July 3, 1951.

One object of the invention is to provide an improved control unit for controlling the application of an operating pressure to a pressure-actuated device, which unit is constructed to operate with a snap action, whereby full pressure is either applied to or shut off from the device being actuated and substantially instantaneous actuation of the device is effected upon operation of the control unit.

An important object is to provide a control unit for controlling the application of an operating pressure to a motor valve or other pressure-actuated device, which unit is adapted to be operated by the differential in two pressures acting upon the unit, whereby a predetermined differential in said pressures effects actuation of the pressure-actuated device; said unit including means for readily varying the differential or differentials which are required to operate the unit, whereby said unit is universally applicable for use in controlling any type of pressure-actuated device.

Another object is to provide a control unit, of the character described, wherein the operating pressure which is directed to the controlled device, may be utilized as one of the pressures acting upon the control unit, whereby the differential between said operating pressure and a predetermined pilot or other pressure functions to control operation of said unit.

A particular object is to provide an improved control unit which operates with a snap action and which comprises a double-acting valve in conjunction with a pressure-responsive element, with the effective areas of the valve members and pressure-responsive element being so related with respect to each other that the attainment of a predetermined control pressure acting on one side of the unit will operate the valve members in one direction to direct operating pressure to a pressure-actuated device; decrease of the control pressure to a predetermined point functioning to operate the valve members in an opposite direction to release application of operating pressure to said pressure-actuated device.

Still another object is to provide a control unit, of the character described, which is particularly adapted for use in controlling the input of an auxiliary lifting fluid or gas into a well; said unit being controlled by pressure conditions in the well tubing, whereby the introduction of the lifting fluid is in accordance with such pressure conditions to assure maximum efficiency in the lifting of the well fluids to the surface.

A further object is to provide a control unit, of the character described, which may be combined with a force-balance control unit, whereby a portion of the operating pressure may be modulated or controlled, with the differential between the modulated pressure and the full operating pressure being utilized to control operation of the unit in applying or shutting off the operating pressure to a pressure-actuated device.

The construction designed to carry out the invention will be hereinafter described together with other features thereof.

Figure 2:
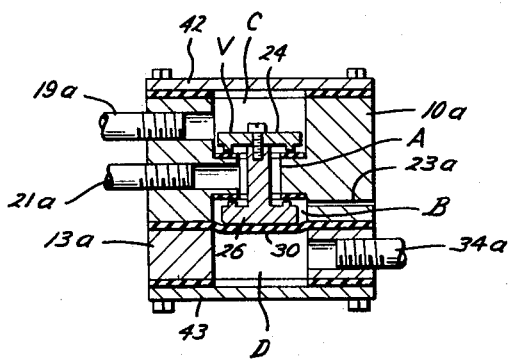

The invention will be more readily understood from a reading of the following specification and by reference to the accompanying drawings forming a part thereof, wherein an example of the invention is shown, and wherein:

Figure 1 is a vertical sectional view of a control unit constructed in accordance with the invention, Figure 2 is a sectional view of a slightly modified form of the invention, Figure 3 is an enlarged vertical sectional view of a modification of the control unit combined with a motor valve, and Figure 4 is a view partly in section and partly in elevation of the form shown in Figure 3 and employed for controlling the input of a lifting fluid or gas into a well.

In the drawings the numeral 10 designates a body or housing which is illustrated as formed of a central section 11, an upper section 12, and a base section 13, which sections may be bolted together or otherwise suitably secured to each other. The base section may be secured to a suitable support 14. The central section 10 is provided with an axial bore 15 which is enlarged or counter-bored at 16 whereby an internal shoulder 17 is provided therein. The upper section 12 of the body or housing is formed with an internal recess 18 which communicates with the upper end of the bore 15 of the central section. When the sections are assembled the bore 15 provides a central chamber A, the counterbore 16 forms a lower chamber B and the recess 18 forms an upper chamber C; these chambers are in communication with each other and may be said to form one large chamber within the housing or body.

An inlet line 19 has connection with a port 20 which extends into the upper chamber C and this inlet conducts an operating fluid pressure to the chamber. An outlet line 21 which is connected within a radial port 22 extends from the chamber A and thus, the operating pressure fluid may flow from the inlet 19 through chamber C, into chamber A and then through line 21. A vent orifice or port 23 extends radially through the central section 10 and establishes communication between the chamber B and atmosphere.

For controlling the communication between the inlet line 19 and the outlet line 21 or between the outlet line 21 and the vent opening 23 a valve assembly V is movable within the chambers A, B and C. This assembly includes an upper valve disc 24 having a seating ring 25 adapted to engage an annular valve seat 26. When the disc is in seated position, as shown in Figure 1, a communication between the inlet line 19 and the outlet line 21 is shut off. The valve assembly also includes a lower valve disc 26 having an annular seating ring 27 arranged to engage a valve seat 28 which is mounted on the internal shoulder 17. This lower valve disc is connected by a shank 29 with the upper valve disc 24, and the length of the shank is such that when the upper valve disc is seated the lower valve disc is unseated; similarly, when the lower valve disc is in a seated position, the upper valve disc is unseated. The effective seating area of the seating ring 25 of the upper valve 24 is greater than the effective seating area 27 of the lower valve disc 26. Below the lowermost valve disc is a pressure-responsive member, such as a flexible diaphragm 30, and this diaphragm spans the lower end of the chamber B, having its peripheral portion clamped between the central section 10 and the base section 13. The effective area of the diaphragm 30 is greater than the effective area of the seating ring 25 of the upper valve disc 24. The under side of the diaphragm 30 is exposed within a chamber D which is formed by a recess 31 provided in the base section 13.

As will be hereinafter explained, a suitable control or variable pressure is introduced into the chamber D and acts upon the under side of the diaphragm 30. Since this diaphragm is in engagement with the lower valve disc 26, the pressure acting against the diaphragm is transmitted to the valve assembly V and will urge the assembly to an upper position. The upper valve disc 24 is exposed to the operating pressure in the inlet line 19, and this is usually a regulated pilot supply pressure so that it is more or less constant. It is therefore evident that the operating pressure in line 19 is acting against the upper valve disc 24 to urge the same to its seated position as shown in Figure 1. The variable pressure within chamber D is acting against the diaphragm 30 in opposition to the operating pressure applied to the upper valve. When the variable pressure in the chamber D reaches a predetermined point which will be controlled by the difference in the effective area of diaphragm 30 and the effective area of the seating ring 25 of the upper valve disc 24, the valve assembly will be moved upwardly. As the upper valve disc 24 is unseated the full operating pressure is admitted into the central chamber A and to the outlet line 21, which line is connected to the diaphragm motor of a pressure-actuated device (not shown) such as a motor valve. At the instant that the pressure in the chamber D acting against diaphragm 30 overcomes the pressure in chamber C acting to hold the upper valve disc seated, both the upper valve disc 24 and the lower valve disc 26 are snapped upwardly and the action is so rapid due to the sudden release of force holding the valve assembly down that the lower valve disc 26 moves into engagement with its seat before the operating pressure can fill the volume of the central chamber A between the upper and lower valve discs. As has been noted, the area of the lower disc 26 is less than the area of the upper valve disc 24, and thus, the operating pressure which is tending to move the valve disc 26 downwardly off of its seat is acting on the lesser area of the lower valve 26 with the result that the pressure within chamber D acting upon the much larger area of diaphragm 30 will maintain the valve assembly in its raised position against the operating pressure flowing through the chamber A and outlet line 21.

The valve assembly will remain in its raised position until the variable pressure in chamber D is reduced to a predetermined point as controlled by the difference in effective areas between the lower valve disc and the diaphragm. When the pressure in the chamber D decreases to a point where the pressure in chamber A starts the lower valve disc downwardly away from its seat, there is a momentary leakage of pressure past the lower valve disc and into the chamber B, and thence outwardly through the vent opening 23. Since the diameter of the vent opening 23 is relatively small, a back pressure is immediately built up within the chamber B on the top side of the diaphragm 30, and this pressure moves the diaphragm downwardly to remove all resistance to lowering of the valve assembly. Thus, the valve assembly is moved downwardly or returned to the position shown in Figure 1 to again seat the upper valve disc 24. In this position the communication between the inlet 19 and the outlet 21 is again shut off while a communication is established between the outlet line and the vent opening 23. Thus, the pressure in the line 21 may bleed off to atmosphere through the vent opening 23 to relieve the pressure which acted upon the motor of the particular pressure actuated device (not shown). The parts remain in this position until the variable pressure in chamber D again builds up a sufficient amount to move the valve assembly upwardly.

The provision of the different effective areas of the two valve discs and the diaphragm 30 assure that the valve assembly V will operate with a snap action. Thus, when the upper valve disc unseats, it is unseated suddenly to conduct full operating pressure to the line 21; similarly when the valve assembly moves downwardly it does so with a snap action to suddenly shut off the pressure from line 21 and to connect line 21 to the vent opening so that said opening may bleed to atmosphere. The device is particularly efficient in controlling a liquid discharge or outlet valve in storage tanks, but is, of course, useful in controlling the operation of any pressure-actuated device.

The particular manner of controlling the variable pressure in the chamber D to effect the operation of the valve may be accomplished in any desired manner, and in Figure 1, the control of this pressure is illustrated as accomplished by a force balance control unit generally indicated at F. In this particular arrangement a portion of the operating pressure from the inlet line 19 is utilized as a modulated pressure which is conducted to the chamber D. As illustrated, the force balance unit F is mounted in the upper end of the upper section 12 of the housing and includes a valve seat 32 which is disposed between the chamber C and a chamber E formed within the unit F. The chamber E communicates through a passage 33 and a conduit 34 with the chamber D. A valve member 35 is movable relative to the seat 32 and is secured to the lower end of a tubular body 36 which is movable within an outer casing 37. A diaphragm 38 has its inner periphery clamped to the tubular body 36 with its outer periphery clamped to the outer casing. A force transmitting element 39 engages the upper end of the tubular body 36 and a chamber 40 is formed within the body and element. A passage 41 establishes communication between the chamber E and the chamber 40.

In the operation of the unit F a variable force is applied to the element 39, and if this force is greater than the pressure in chamber E the tubular housing 36 and valve 35 attached thereto is moved downwardly off of its seat 32. As soon as the valve 35 disengages the seat 32 pressure from the chamber C which is the operating pressure in line 19 begins to enter chamber E and acts against the under side of diaphragm 38 to move the housing 36 and valve 35 upwardly; this reseats the valve 35 which remains seated until additional force is applied to the element 39. However, the unseating of the valve together with its substantially instantaneous return to its seated position has admitted some pressure into chamber E which, of course, communicates with chamber D. As additional force is applied to the element 39 the action of valve 35 is repeated, and pressure in chamber E as well as in chamber D is built up in accordance with applied force. When applied force reaches the point which has increased pressure in chamber D sufficient to move the valve assembly V upwardly, full operating pressure is conducted to outlet line 21. In this case the particular pressure-actuated device which is operated by pressure in line 21 bears a relationship to the force applied to the element 39 of the unit F so that upon actuation the applied force is reduced. When this occurs the pressure in chamber D acting through conduit 34 and within chambers E and 40 is sufficient to separate the force-applying element 39 from the tubular body 36 and such separation allows a venting of some of the pressure from chamber D. It is therefore obvious that when the force applied to element 39 has been reduced sufficiently to decrease the pressure in chamber D, the valve assembly V is again moved downwardly. As has been mentioned the particular force-balance unit F may be combined with the control unit where it is desirable to control a pressure-actuated device in accordance with applied force, but the invention is not limited to controlling the pressure in the chamber D in this particular manner.

In Figure 2 a simplified form of the control unit is shown wherein a body 10a is formed with the intermediate chamber A, the lower chamber B and upper chamber C. A closure plate 42 closes the upper chamber C while a base section 13a is substituted for the base 13 of the first form. The base section 13a is formed with chamber D which is closed by a suitable plate 43. The valve assembly V is movable within the chambers A, B and C and the diaphragm 30 is disposed between chambers B and D in the manner heretofore described. The operating pressure is conducted to chamber C through an inlet line 19a and is conducted from chamber A through an outlet line 21a. A variable controlled pressure is conducted to the chamber D through a conduit 34a. The body 10a is formed with the vent opening 23a which extends from the chamber B.

It will be evident that the operation of this form is identical to the operation of the unit shown in Figure 1. The particular pressure conducted to chamber D is variable and when this pressure increases a predetermined amount as controlled by the relationship of the upper valve disc area to the diaphragm area, the valve assembly V establishes communication between the valve inlet 19a and the outlet 21a. Similarly, when pressure is decreased in chamber D, the valve assembly returns to the position shown in Figure 2 to shut off communication between lines 19a and 21a and to establish communication between the outlet 21a and the vent opening 23a.

The control unit comprising the present invention has been found particularly adaptable for controlling the input of lifting fluids, such as gas or air, into a well tubing for the purpose of lifting well fluids and in Figures 3 and 4, a modification of the invention for this purpose is shown. Referring to Figure 3, the control unit comprises a body or housing 110 which has the chambers A, B and C formed therein. The valve assembly V including the upper valve disc 24, and the lower valve disc 26, is movable within the chambers. The housing 110 is adapted to be connected to the upper section 50 of a diaphragm case, and this section has the chamber D formed therein. An inlet line 119 is connected in the upper end of the housing 110 and conducts the operating pressure to the upper chamber C. The outlet line 121 extends from the chamber A and is connected to the area 51 above a main operating diaphragm 52 of a control valve 53. The valve is shown as a ball adapted to engage a seat 54 with a valve stem 55 connected with the main valve diaphragm 52 and engageable with said ball. It will be evident that when pressure is conducted to the area 51 above the diaphragm 52 the ball 53 is moved to a seated position; when the pressure in area 51 is released the valve 53 may be unseated to permit flow past the seat 54. The housing 110 is formed with a vent opening 123 extending from the chamber C while a passage 56 extends from the chamber D and has a conduit 134 connected thereto. The conduit 134 is adapted to conduct a variable pressure into chamber D, while the line 119 conducts an operating pressure which is maintained more or less constant into chamber C. When pressure in chamber D is increased sufficiently in accordance with effective areas of the diaphragm 30 underlying the lower valve disc 26 and the area of the upper valve disc 24, the valve assembly V moves upwardly to apply operating pressure through outlet 121 to the upper end of the main diaphragm 52 of the valve 53, whereby said valve is closed. When pressure in chamber D decreases sufficiently to allow the valve assembly to again move to its lower position, the upper valve disc 24 is seated to shut off operating pressure to the main valve diaphragm 52 and to establish communication between the area 51 and the vent opening 123 so that the main valve 53 may be opened.

In applying the assembly shown in Figure 3 to a gas lift operation the main valve 53 is connected through a line 57 with a suitable lifting fluid supply. The line 57 communicate with the bore 58 of the valve housing so that said lifting fluid flows past the seat 54. A lateral pipe 59 connects the valve housing beyond the valve seat 54 with the usual casing head 60 mounted on the well casing 61. Thus, when the valve 53 is open, lifting fluid is supplied to the well casing and moves downwardly within the annular space between the casing and the usual well tubing 62. The well tubing is supported in the usual tubing head 63.

For controlling the supply of lifting fluid in accordance with tubing head pressure, the tubing head has connection through the line 134 with the chamber D of the control unit. The line 119 which is connected to the upper end of the control unit and which supplies operating pressure may extend from the valve housing so that the supply of operating pressure may be from the well casing; however, it is pointed out that this operating pressure may be supplied from any suitable source.

Referring to Figure 4, it is pointed out that the tubing head pressure reflects the weight of the flowing fluid column in the tubing and the lighter the fluid column, the higher the tubing head pressure. Thus, the tubing head pressure varies in accordance with the weight of the column of fluid within the tubing, and this variable tubing head pressure is utilized as the variable pressure conducted to the chamber D of the control unit. When the tubing head pressure increases to a certain point due to the decrease in liquid column within the tubing 62, the valve assembly V of the control unit is moved upwardly to direct operating pressure to the main diaphragm 52 of the valve 53 to thereby close said valve and shut off any further flow of lifting gas into the casing. This condition remains until the fluid column builds up in the tubing to a predetermined point as represented by a decrease in tubing head pressure. At this time there is sufficient liquid in the tubing for the lifting fluid injection cycle to be carried out and this decrease in tubing head pressure acting within the chamber D results in an operation of the valve assembly V to move said valve assembly to its lower position. As explained, this shuts off the operating pressure from line 119 to the main diaphragm 52 and establishes communication between the area 51 above the diaphragm and the vent opening 123. This relieves pressure on the main diaphragm 52 and allows the main valve 53 to open and supply additional lifting fluid into the tubing. Introduction of the lifting fluid will continue until the tubing head pressure has again been increased due to the reduction in the fluid column within the tubing. The device therefore provides a positive and accurate control of the introduction of a lifting fluid in accordance with liquid conditions in the tubing.

It might be noted that in gas lifting operations it often occurs that the well liquid is exhausted from the top of the tubing at a rate greater than the formation will supply liquid to the bottom, with the result that the total weight of the aerated liquid column grows lighter. With normal gas lift valves, lightening of the column causes more gas to be admitted from the casing into the tubing just at a time when a decrease of gas admission should be occurring. The present device accurately controls the admission of the lifting fluid in accordance with actual liquid column conditions within the tubing.

From the foregoing, it will be evident that a simple and effective control unit which is universally applicable for controlling pressure-actuated devices is provided. As illustrated in Figure 1 the well device may be combined with a force balance unit and as illustrated in Figures 3 and 4 may be utilized to accurately control introduction of lifting fluid in gas lift operations. The particular examples of use of the unit are illustrative only and are not to be construed in a limiting sense. A particular feature of the control unit is the arrangement whereby snap action control is accomplished, which means that the particular device being actuated will be operated with a snap action; in the case of a valve, said valve would be quick opening and quick closing and there would be no likelihood of a throttling or chattering action during operation.

What I claim is:

1. A control unit including, a housing having a chamber therein, a pressure fluid inlet extending to the chamber, an outlet line extending from the chamber, a restricted vent opening extending from said chamber, a valve assembly movable to two positions in said chamber, said valve assembly being movable solely by the pressures acting thereon, one position of the valve assembly closing off communication between the inlet and outlet of said chamber and establishing communication between the outlet line and vent opening and the second position of the valve shutting off communication between the outlet line and vent opening and establishing communication between the inlet and outlet, said valve assembly exposing a predetermined effective area to the pressure fluid in the inlet line and constantly exposing one side of a second larger effective area to a second and different variable pressure when the valve assembly is in its first position, whereby a predetermined pressure differential acting on said first and second areas moves the valve assembly to its second position with a snap action, movement of the valve assembly to said second position exposing a third effective area which is less than the first effective area to the pressure fluid in the inlet, whereby return of the valve assembly to its first position is controlled by the differential in pressures acting upon the second and third effective areas, the vent opening which extends from said chamber being of a sufficiently restricted size with respect to the capacity of the chamber that upon the beginning of return movement of the valve member toward its first position, pressure in the chamber is momentarily maintained therein to act upon that side of the second effective area which is opposite to the side exposed to the variable pressure to thereby complete return movement of the valve assembly to its first position with a snap action.

2. A control unit as set forth in claim 1, wherein the valve assembly comprises a first valve element and a second valve element with means connecting said valve elements whereby said elements move as a unit, and spaced valve seats within the chamber adapted to be engaged by said valve elements, the connecting means between said valve elements spacing said valve elements so that when one is seated the other is unseated.

3. A control unit including, a housing having an axial bore with an enlarged chamber at each end of said bore, a double valve assembly comprising spaced valve elements movable as a unit within the bore and chambers and disposed one in each chamber, said spacing being such that when one valve is seated the other is unseated, said valve elements having different effective areas, means for directing a pressure fluid into the chamber within which the larger valve element is disposed whereby this pressure urges said larger valve toward a seated position and also urges the smaller valve to unseated position, a pressure-responsive member spanning the second chamber within which the smaller valve element is disposed and adapted to engage one side of said smaller valve element, means for constantly directing a controlled pressure against the pressure-responsive member, whereby when said controlled pressure reaches a predetermined point the valve assembly is moved to unseat the larger valve element and to seat the smaller valve element, a conductor extending from the bore of the housing between the valve elements for conducting the pressure fluid therefrom when said fluid flows into the bore upon unseating of the larger valve element, said smaller valve element having its side opposite that engaged by the pressure-responsive member exposed to the pressure in the bore of the housing after the larger valve element has been unseated, whereby subsequent seating of the larger valve element is effected by the differential in the pressure acting on the smaller valve element and the pressure acting on the pressure-responsive member, the chamber in which said smaller valve element is disposed having a restricted vent opening extending therefrom, which vent opening is shut off from the axial bore of the housing when said smaller valve element is seated but is in communication with said bore when said smaller valve element is unseated, the size of the vent opening being restricted with respect to the capacity of the axial bore and the chamber from which it extends so that upon initial movement of the smaller valve element from its seated position, pressure is momentarily maintained in said bore and chamber to cause movement of said smaller valve element to fully unseated position and movement of the larger valve element to fully seated position with a snap action.

4. A control unit including, a housing having a chamber therein, a pressure fluid inlet extending into one end of the chamber, an outlet line extending from the intermediate portion of the chamber, a first valve seat between the inlet and the outlet, a restricted vent opening extending from the end of the chamber which is opposite the fluid inlet, a second valve seat between the outlet and the vent opening, a valve assembly actuated solely by the pressures acting thereon and including a first valve element and a second valve element adapted to engage the first and second valve seats, and also including a pressure-responsive diaphragm engageable with one side of the second valve element, the assembly being movable to two positions within the chamber, one position thereof engaging the first valve element with the first valve seat to close off communication between the inlet and outlet and at the same time unseating the second valve element from the second valve seat to establish communication between the outlet and the vent opening, the second position of the valve assembly unseating the first valve element to establish communication between the inlet and outlet and seating the second valve to shut off communication between the vent opening and outlet, the effective area of the first valve element being larger than the effective area of the second valve element and the effective area of the diaphragm being larger than the effective area of said first valve element, said first valve element being held in seated position by the pressure from the inlet acting thereon, means for directing a different pressure against the diaphragm for urging said first valve element from its seat, the attainment of a predetermined differential of pressure acting upon said first valve element and said diaphragm moving the first valve element from its seat, initial unseating of the first valve element directing inlet pressure into the chamber and against the lesser area of the second valve element whereby full unseating of said first valve element and seating of the second valve element is accomplished with a snap action, subsequent unseating of the second valve element and reseating of the first valve element being controlled by the differential in pressures acting upon the second valve element and the diaphragm, the vent opening which extends from said chamber being of a sufficiently restricted size with respect to the capacity of the chamber that upon the beginning of unseating of the second valve member, pressure in the chamber is momentarily maintained therein to act upon the diaphragm and thereby complete unseating of the second valve element and reseating of the first valve element with a snap action.

References Cited in the file of this patent
UNITED STATES PATENTS

| 172,492 | Prall | Jan. 18, 1876 |
| 1,373,599 | Clark | Apr. 5, 1921 |
| 1,583,642 | Bailey | May 4, 1926 |
| 1,652,710 | Dotterweich | Dec. 13, 1927 |
| 1,779,319 | Jennings | Oct. 21, 1930 |
| 2,097,201 | Renkenberger | Oct. 26, 1937 |
| 2,339,487 | King | Jan. 18, 1944 |
| 2,587,357 | McPherson | Feb. 26, 1952 |
| 2,858,840 | Wright | Nov. 4, 1958 |

FOREIGN PATENTS

| 502,039 | Italy | Nov. 26, 1954 |